(12) United States Patent
Orzechowski et al.

(10) Patent No.: US 10,870,423 B1
(45) Date of Patent: Dec. 22, 2020

(54) TRANSFER CASE CONTROL TO RELIEVE FRONT DRIVELINE RESIDUAL TORQUE

(71) Applicants: Jeffrey M Orzechowski, Troy, MI (US); Kenneth Pachucki, Lapeer, MI (US); Urmit Patel, Macomb, MI (US); Robert R Roco, Troy, MI (US); Gregory A Sbroglia, Farmington Hills, MI (US); Donald F Schmanski, Howell, MI (US); Swapneel H Gharpure, Bloomfield Township, MI (US)

(72) Inventors: Jeffrey M Orzechowski, Troy, MI (US); Kenneth Pachucki, Lapeer, MI (US); Urmit Patel, Macomb, MI (US); Robert R Roco, Troy, MI (US); Gregory A Sbroglia, Farmington Hills, MI (US); Donald F Schmanski, Howell, MI (US); Swapneel H Gharpure, Bloomfield Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/537,677

(22) Filed: Aug. 12, 2019

(51) Int. Cl.
*B60W 10/119* (2012.01)
*B60T 8/173* (2006.01)
*F16D 48/06* (2006.01)
*B60W 30/18* (2012.01)

(52) U.S. Cl.
CPC .......... *B60W 10/119* (2013.01); *B60T 8/173* (2013.01); *F16D 48/06* (2013.01); *B60W 30/18118* (2013.01)

(58) Field of Classification Search
None
See application file for complete search history.

(56) References Cited

U.S. PATENT DOCUMENTS

| | | | |
|---|---|---|---|
| 4,718,303 A | 1/1988 | Fogelberg et al. | |
| 4,901,598 A | 2/1990 | Batchelor et al. | |
| 6,161,643 A | 12/2000 | Bober et al. | |
| 6,283,887 B1 | 9/2001 | Brown et al. | |
| 6,533,693 B2 | 3/2003 | Bowen et al. | |
| 6,878,088 B2 | 4/2005 | Williams et al. | |
| 6,905,436 B2 | 6/2005 | Mueller et al. | |
| 7,442,148 B2 | 10/2008 | Eckle et al. | |
| 8,886,428 B2 * | 11/2014 | Mori | B60K 23/0808 701/67 |
| 8,977,429 B2 | 3/2015 | Hendry et al. | |
| 9,108,512 B2 * | 8/2015 | Imafuku | B60K 17/3467 |
| 10,293,688 B2 * | 5/2019 | Arai | B60K 17/344 |
| 10,500,953 B2 * | 12/2019 | Yamamoto | B60K 23/0808 |
| 2003/0051965 A1 | 3/2003 | Hirt et al. | |

* cited by examiner

*Primary Examiner* — Dirk Wright
(74) *Attorney, Agent, or Firm* — Ralph E Smith

(57) ABSTRACT

A vehicle includes an engine, a pair of front axle shafts, and a transfer case having a clutch assembly configured to selectively move between a closed position to enable the engine to drive the front axle shafts, and an open position to disable the engine from driving the front axle shafts. A control system is configured to momentarily open the clutch assembly when the vehicle is coming to a stop or is stopped in order to relieve residual torque build-up in the front axle shafts to thereby reduce idle vibration transmission between the engine and a body of the vehicle.

19 Claims, 4 Drawing Sheets

TRANSFER CASE CONTROL TO RELIEVE FRONT DRIVELINE RESIDUAL TORQUE

FIELD

The present application relates generally to vehicle powertrains and, more particularly, to transfer case clutch control to relieve front driveline residual torque for idle vibration improvement.

BACKGROUND

A transfer case is typically utilized in vehicles that power all four of the vehicle's wheels (e.g., four-wheel drive vehicles). The transfer case is connected to the transmission and directs power to both the front and rear axles. In particular, in one implementation, the transfer case receives power from the engine through the transmission and transfers that power to the front and rear axles.

Axle-on-engine with solid mounted front cradle architecture can provide many benefits including improved vision down-angle, more efficient body structure, and improved noise, vibration and harshness (NVH) isolation of axle whine, driveline imbalance, and front driveline torsional vibration. One potential drawback of using this architecture for four-wheel vehicles is that, during drive-idle operation only with applied static torque, engine shaking vibration may be transmitted to the car body through the front half shaft path into the steering knuckles. Accordingly, while such systems do work well for their intended purpose, there remains a desire for improvement in the relevant art.

SUMMARY

In accordance with one example aspect of the invention, a vehicle is provided. In one exemplary implementation, the vehicle includes an engine, a pair of front axle shafts, and a transfer case having a clutch assembly configured to selectively move between a closed position to enable the engine to drive the front axle shafts, and an open position to disable the engine from driving the front axle shafts. A control system is configured to momentarily open the clutch assembly when the vehicle is coming to a stop or is stopped in order to relieve residual torque build-up in the front axle shafts to thereby reduce idle vibration transmission between the engine and a body of the vehicle.

In addition the foregoing, the described vehicle may include one or more of the following features: wherein the control system momentarily opens the clutch assembly to relieve residual torque build-up only when the vehicle is operating in a four-wheel drive mode or an all-wheel drive mode where the clutch assembly is in the closed position such that the engine drives the front axle shafts; wherein the momentary opening of the clutch assembly comprises opening the clutch assembly for less than or equal to 5.0 seconds; wherein the momentary opening of the clutch assembly comprises opening the clutch assembly for less than or equal to 1.0 second; wherein control system momentarily opens the clutch assembly only when the vehicle is stopped; and wherein control system momentarily opens the clutch assembly only when the vehicle is coming to a stop.

In addition the foregoing, the described vehicle may include one or more of the following features: wherein the control system includes a controller in signal communication with a drive mode sensor, and the control system momentarily opens the clutch assembly only if the controller receives a signal from the drive mode sensor indicating the vehicle is in an on-road drive mode; wherein the control system includes a controller in signal communication with a vehicle speed sensor, and the control system momentarily opens the clutch assembly only if the controller receives a signal from the vehicle speed sensor indicating a speed of the vehicle is below a first predetermined threshold and/or the accelerator pedal position is below a second predetermined threshold position; and wherein the control system includes a controller in signal communication with a brake pressure sensor, and the control system momentarily opens the clutch assembly only if the controller receives a signal from the brake pressure sensor indicating a brake torque driver request is above a first predetermined threshold and/or an actual brake torque is above a second predetermined threshold.

In addition the foregoing, the described vehicle may include one or more of the following features: wherein the control system includes a controller in signal communication with a gear selection sensor, and the control system momentarily opens the clutch assembly only if the controller receives a signal from the gear selection sensor indicating a vehicle transmission is in Drive; wherein the control system includes a controller in signal communication with an incline sensor, and the control system momentarily opens the clutch assembly only if the controller receives a signal from the incline sensor indicating a slope of a surface the vehicle is on is less than a predetermined threshold; and wherein the control system starts a timer when the clutch assembly is momentarily opened and only closes the clutch assembly when the time since the momentary opening is greater than a predetermined threshold.

In accordance with an example aspect of the invention, a method of controlling a vehicle having an engine, a pair of front axle shafts, and a transfer case having a clutch assembly selectively movable between a closed position where the engine is enabled to drive the front axle shafts, and an open position where the engine is disabled from driving the front axle shafts, is provided. The method includes, in one exemplary implementation, operating the transfer case in a four-wheel drive mode or an all-wheel drive mode where the clutch assembly is in the closed position and the engine drives the front axle shafts. When the clutch assembly is in the closed position and the vehicle is coming to a stop or is stopped, momentarily opening the clutch assembly in order to relieve residual torque build-up in the front axle shafts to thereby reduce idle vibration transmission between the engine and a body of the vehicle.

In addition the foregoing, the described method may include one or more of the following features: determining the vehicle is in an on-road drive mode, wherein said momentary opening of the clutch assembly is not performed if the vehicle is not in the on-road drive mode; determining if a vehicle speed is less than a first predetermined threshold and/or if an accelerator pedal position is less than a second predetermined threshold, wherein said momentary opening of the clutch assembly is not performed if the vehicle speed is greater than the first predetermined threshold and/or if the accelerator pedal position is greater than the second predetermined threshold; and determining if a brake torque driver request is greater than a first predetermined threshold and/or if an actual brake torque is greater than a second predetermined threshold, wherein said momentary opening of the clutch assembly is not performed if the brake torque driver request is less than the first predetermined threshold and/or if the actual brake torque is less than the second predetermined threshold.

In addition the foregoing, the described method may include one or more of the following features: determining if a transmission of the vehicle is in Drive, wherein said momentary opening of the clutch assembly is not performed if the vehicle transmission is not in Drive; determining if a slope of a surface the vehicle is on is less than a predetermined threshold, wherein said momentary opening of the clutch assembly is not performed if the slope is greater than the predetermined threshold; and determining if the vehicle is in an on-road drive mode, determining if a vehicle speed is less than a first predetermined threshold and if an accelerator pedal position is less than a second predetermined threshold, determining if a brake torque driver request is greater than a third predetermined threshold and if an actual brake torque is greater than a fourth predetermined threshold, determining if a transmission of the vehicle is in Drive, and determining if a slope of a surface the vehicle is on is less than a fifth predetermined threshold, wherein said momentary opening of the clutch assembly is performed if the vehicle is in the on-road drive mode, the vehicle speed is less than the first predetermined threshold, the accelerator pedal position is less than the second predetermined threshold, the brake torque driver request is greater than the third predetermined threshold, the actual brake torque is greater than the fourth predetermined threshold, the vehicle transmission is in Drive, and the slope is less than the fifth predetermined threshold.

Further areas of applicability of the teachings of the present application will become apparent from the detailed description, claims and the drawings. It should be understood that the detailed description, including disclosed embodiments and drawings referenced therein, are merely exemplary in nature intended for purposes of illustration only and are not intended to limit the scope of the present application, its application or uses. Thus, variations that do not depart from the gist of the present application are intended to be within the scope of the present application.

DESCRIPTION

In some vehicles, such as those with front axles mounted directly to an engine, residual torque is built up in the front axles when the vehicle is brought to a stopped, drive-idle condition. This residual torque causes the front axles to wind up and become stiff, which enables the front axles to transmit engine shaking related vibration into the front knuckles and subsequently into the entire vehicle. In order to relieve the residual torque, a control system momentarily opens a transfer case clutch after the vehicle comes to a stop or is coming to a stop, as described herein in more detail.

Accordingly, the systems described herein decouple vibration between the engine (vibration source) and the path into the car body (front axle shafts) before the vibration is felt by vehicle occupants. Such isolation is achieved by defeating the ability of the front axle shafts to transmit vertical and transversal/shaft-bending-direction vibration from the engine into the front suspension by reducing the residual static torque in the front driveline. This reduction in residual static torque is configured to make the front axle shafts "softer" and less able to transmit shaking vibration from the engine into the steering knuckles.

Figure 1:
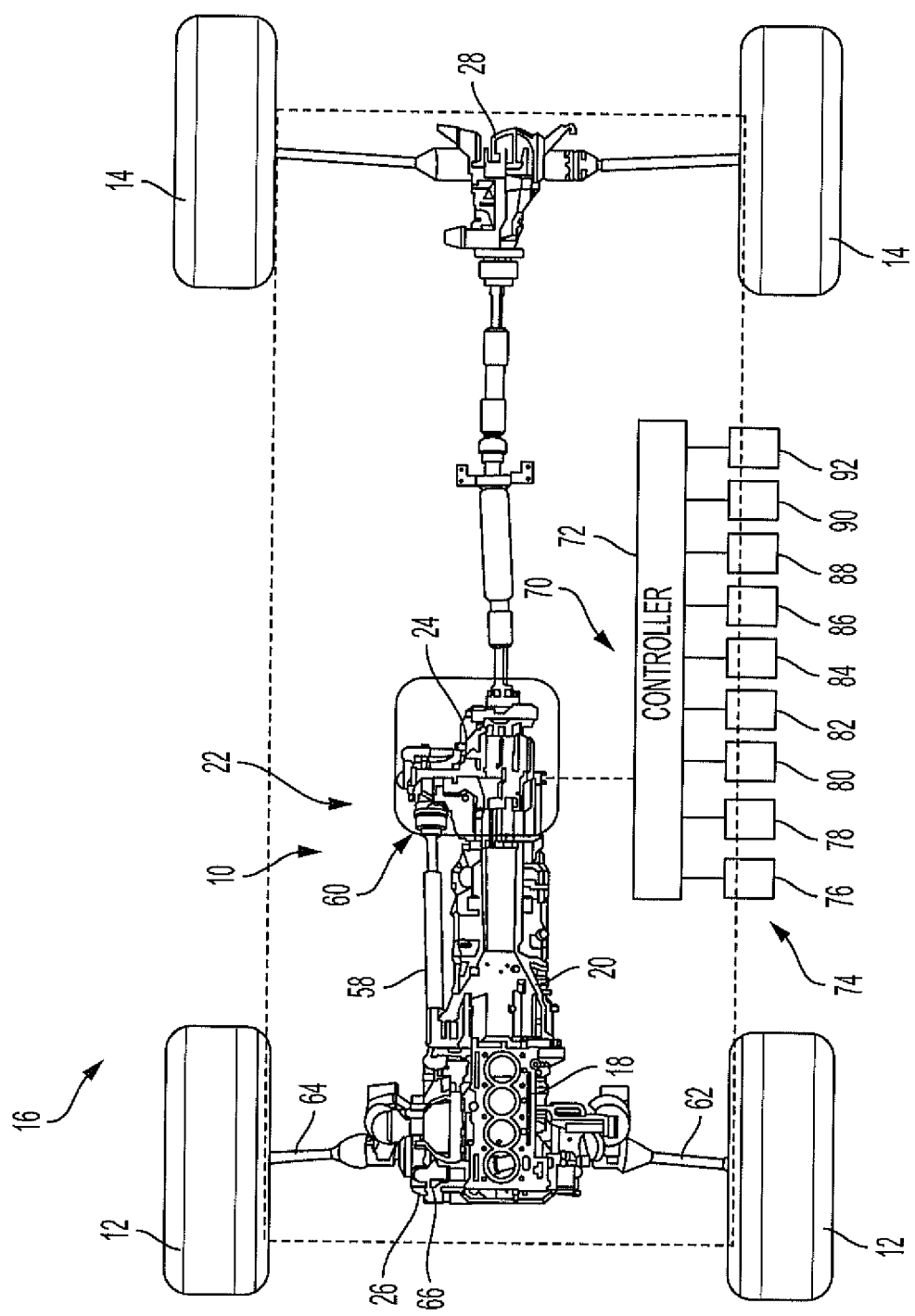
FIG. 1 is a top view of an example powertrain for a four-wheel drive vehicle in accordance with the principles of the present application.

With initial reference to FIG. 1, a four-wheel drive powertrain for a motor vehicle is generally shown and indicated at 10. The powertrain 10 generally is shown operably installed between a pair of front wheels 12 and a pair of rear wheels 14 of a four-wheel drive motor vehicle 16, which is shown only in part to highlight the powertrain 10. However, it will be understood that motor vehicle 16 may be any type of vehicle such as, for example, a sport utility vehicle. Moreover, in the example embodiment, vehicle 16 is an axle-on-engine with solid mounted front cradle architecture. However, it will be appreciated that the systems described herein are usable within various other vehicle architectures.

Both pairs of wheels 12, 14 are drivable from a source of power, such as an internal combustion engine 18, through a transmission 20, which may be of either the manual or automatic type. In the example embodiment, the vehicle 16 is a rear wheel drive vehicle operable for normally driving the rear wheels 14 in a two-wheel drive mode. A torque transfer system 22 is utilized to further drive the front wheels 12 in a four-wheel drive mode.

In the illustrated example, torque transfer system 22 generally includes a transfer case 24, a front differential unit 26, and a rear differential unit 28. The transfer case 24 is configured to automatically transfer torque between the front wheels 12, and the rear differential unit 28 is configured to automatically transfer torque between the rear wheels 14.

Figure 2:
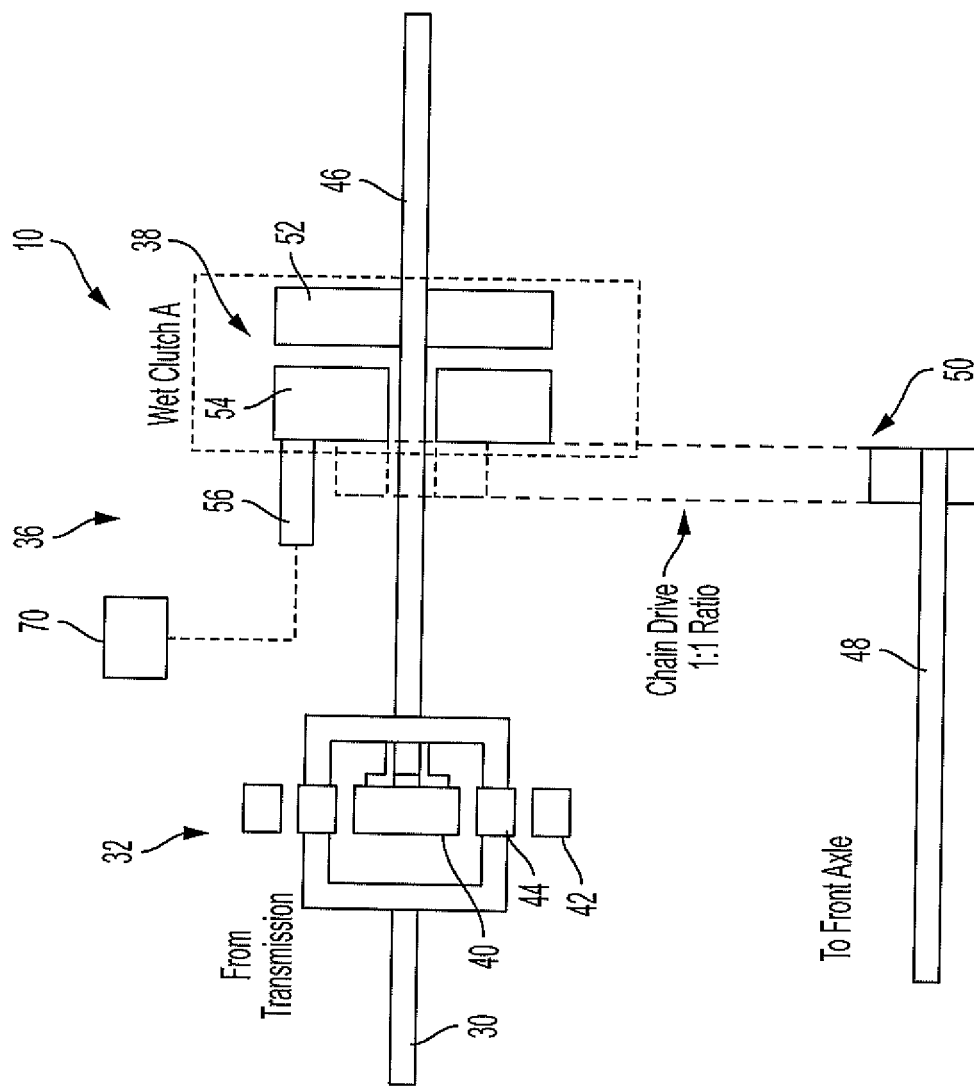
FIG. 2 is a schematic view of a portion of the example powertrain shown in FIG. 1, in accordance with the principles of the present application.

With additional reference to FIG. 2, in the example embodiment, transfer case 24 generally includes an input shaft 30, a planetary type gear reduction unit 32, a lock-out mechanism 36, and a clutch assembly 38. The input shaft 30 is rotatably driven by the engine 18 through the transmission 20, and the planetary type gear reduction unit 32 is rotatably driven by the input shaft 30 at a reduced speed ratio relative thereto. The planetary type gear reduction unit 32 includes a sun gear 40, a ring gear 42, and a planetary carrier 44. Although shown as a one-speed transfer case, it will be appreciated that transfer case 24 may provide more than one speed, for example, via a range shift mechanism.

The lock-out mechanism 36 is configured to selectively couple a front output shaft 48 to the rear output shaft 46 to establish the four-wheel drive mode. The clutch assembly 38 is configured to control torque transfer from the rear output shaft 46 to the front output shaft 48 to establish an on-demand four-wheel drive mode. A chain drive arrangement 50 is configured to transmit drive torque from the rear output shaft 46 to the front output shaft 48.

In the example embodiment, the clutch assembly 38 is configured to automatically and progressively couple rotating shafts 46, 48 in response to rotational speed differences therebetween. In the illustrated example, the clutch assembly 38 is a wet clutch having a first clutch member 52 and a second clutch member 54. However, other clutch arrangements are contemplated such as, for example, two clutch members with interleaved clutch plates. The first clutch member 52 is fixed to the rear output shaft 46 via a splined connection, and the second clutch member 54 is fixed to one end of the chain drive arrangement 50. In some embodiments, an actuator 56 (e.g., a hydraulic piston) is selectively actuated to apply a compressive clutch engagement force on the clutch assembly 38 to engage the first and second clutch members 52, 54 and thereby transfer drive torque from the rear output shaft 46 to the front output shaft 48. As described herein in more detail, the clutch assembly 38 is selectively opened (disengaged) to momentarily relax the front driveline torque when the vehicle is stopped or coming to a stop.

With continued reference to FIG. 1, in the example embodiment, the front differential unit 26, which is part of a front axle assembly, is rotatably driven by the engine 18 via a front prop shaft 58. As illustrated, the front prop shaft 58 is coupled to the front output shaft 48 through a universal joint 60. The front differential unit 26 is configured to drive a pair of half shafts or axle shafts 62, 64 of the front axle assembly, and includes a housing 66 for containing a coupling (not shown) and having suitable seals through which the axle shafts 62, 64 and the front prop shaft 58 project. Within the housing 66, the coupling rotatably couples the axle shafts 62, 64 to be driven by the front prop shaft 58.

In the example embodiment, vehicle 16 further includes a control system 70 configured to control operation of the powertrain 10 including the transfer case 24 and clutch assembly 38. In the example embodiment, control system 70 generally includes a controller 72 and a plurality of vehicle sensors 74. As shown in FIG. 2, the controller 72 is in signal communication with the clutch assembly actuator 56 and the plurality of vehicle sensors 74. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality.

In the example embodiment, the plurality of sensors 74 includes, but is not limited to, a brake pressure sensor 76, an engine speed sensor 78, a vehicle speed sensor 80, a gear selection sensor 82, a drive mode or driving surface type selector sensor 84, an incline sensor 86, an engine type sensor 88, a temperature sensor 90, and any other sensor 92 configured to provide desired information about vehicle 16. The brake pressure sensor 76 is configured to provide one or more signals indicating brake torque driver request and actual brake torque. The engine speed sensor 78 is configured to provide one or more signals indicating engine speed. The vehicle speed sensor 80 is configured to provide one or more signals indicating a speed of vehicle 16 and/or an accelerator pedal position. The gear selection sensor 82 is configured to provide one or more signals indicating which vehicle transmission gear is selected (park, reverse, neutral, drive, low, etc). Drive mode sensor 84 is configured to provide one or more signals indicating a surface type selector state (snow, mud, sand, etc.). Incline sensor 86 is configured to provide one or more signals indicating an incline of the surface the vehicle 16 is on. Engine type sensor 88 is configured to provide one or more signals indicating type of engine (e.g., four cylinder, six cylinder, etc.). The temperature sensor 90 is configured to provide one or more signals indicating a temperature related to the vehicle (ambient temp, engine temp, etc.).

In the example embodiment, control system 70 is configured to momentarily open the transfer case clutch assembly 38 under predetermined conditions in order to relieve residual torque build up in the front axles 62, 64 as the vehicle is brought to a stop. As noted above, this residual torque can lead to stiffening of the axle shafts and subsequent unwanted transmission of engine shaking related vibration through the front knuckles (not shown) and into other portions of the vehicle.

Figure 3:
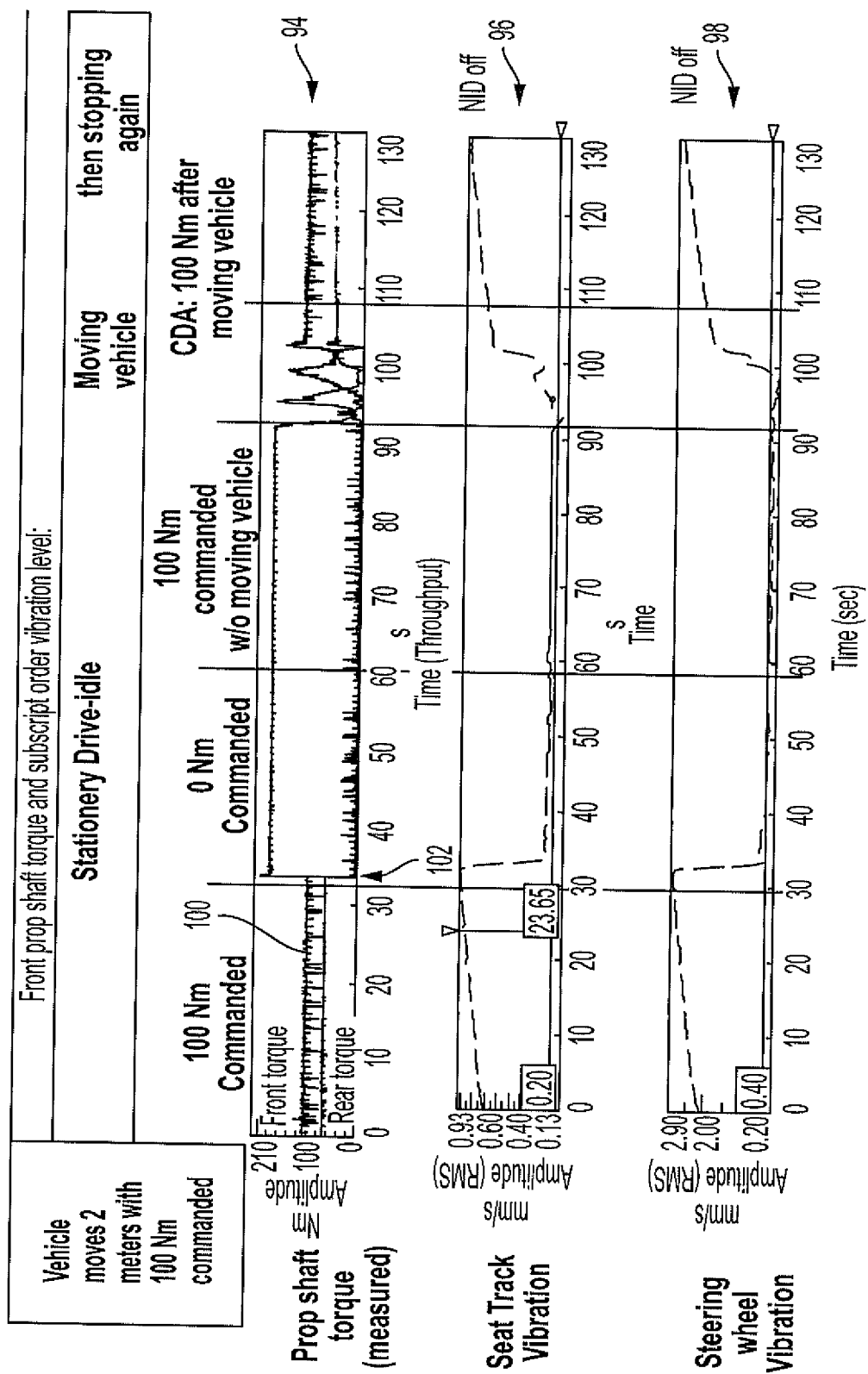
FIG. 3 is a graph illustrating an example idle vibration reduction that occurs from one example torque relieving control strategy, in accordance with the principles of the present application.

As such, the control system 70 is configured to relieve or relax the front driveline torque by briefly opening (e.g., pulsing) the clutch and absorbing the energy as slip energy in the clutch to yield significant ide vibration improvement. One example of vibration reduction is illustrated in FIG. 3, where prop shaft torque is shown in graph 94, seat track vibration is shown in graph 96, and steering wheel vibration is shown in graph 98. Front prop shaft toque is shown by line 100 and control system 70 relieves front driveline torque at point 102. As illustrated, at this time, the vibration shown in graphs 96, 98 is significantly reduced or eliminated in stationary drive-idle until the vehicle begins to move and the front driveline torque is again built up.

In one control method, after vehicle 16 comes to a stop and with torque commanded to the front driveline (58, 62, 64), the controller 72 temporarily and briefly opens the clutch assembly 38 (e.g., via actuator 56) to relieve the residual front driveline torque. After the brief time, the controller 72 then closes the clutch assembly 38 to enable instantaneous, no delay on-demand torque for smooth vehicle launch performance.

In another control method, when braking is applied (e.g., brake pedal pressed) and the vehicle 16 is coming to a stop, the controller 72 opens the clutch assembly 38 (e.g., via actuator 56) to relieve the residual front driveline torque. Then, as soon as the vehicle 16 is stopped, the controller 72 closes the clutch assembly 38 to provide the delay-free on-demand torque transfer to the front driveline. In both methods, buildup of residual torque in the front driveline and front axle shaft system is prevented, thereby enabling the front axle shaft joints to remain "soft" and provide vibration isolation from the engine 18 to the rest of the vehicle.

Figure 4:
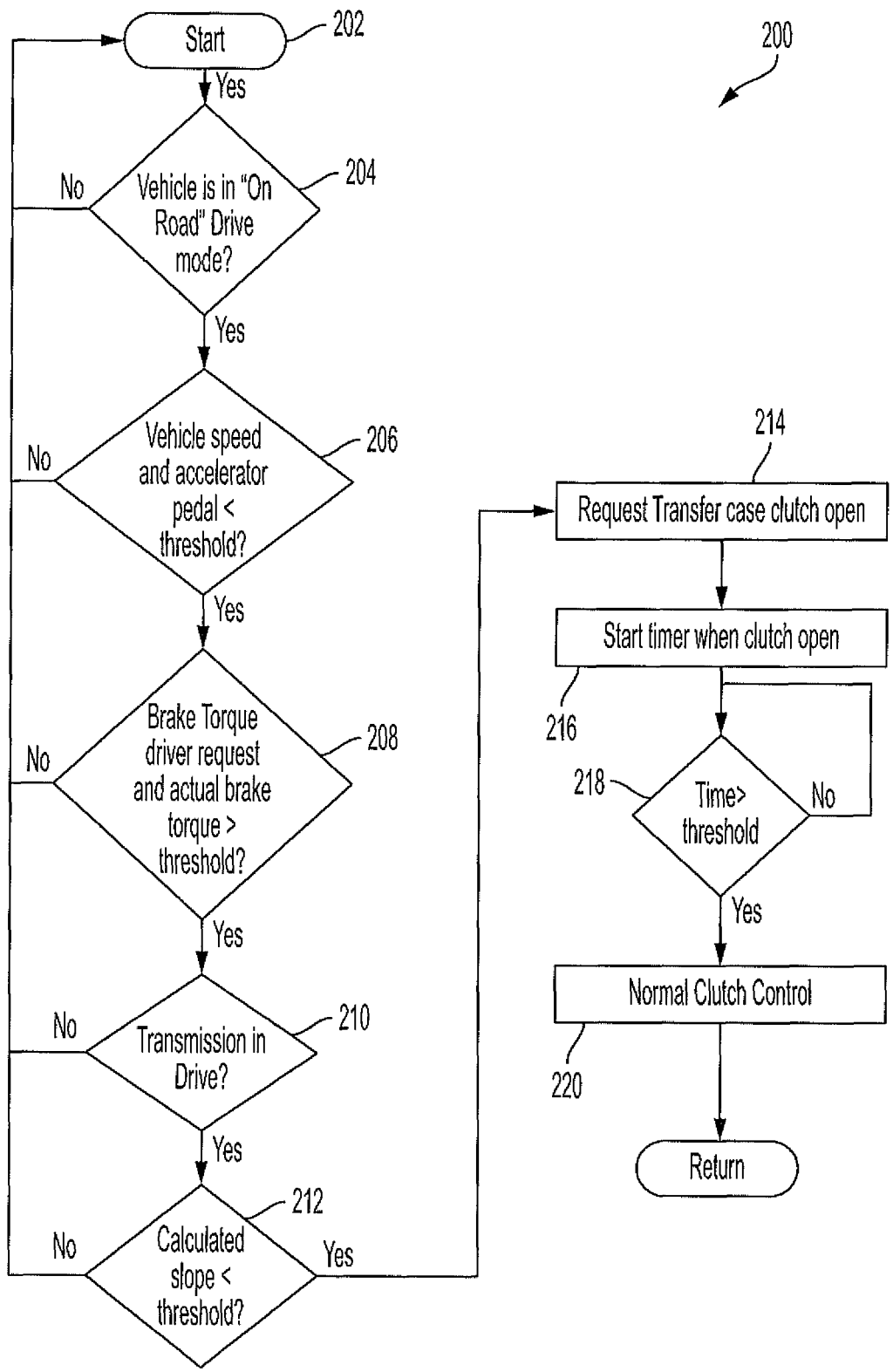
FIG. 4 is a flow chart illustrating an example torque relieving operation of the powertrain shown in FIG. 1, in accordance with the principles of the present application.

With reference now to FIG. 4, one example control method 200 is illustrated and begins at step 204 where the controller 72 determines if the vehicle is in a mode that enables front driveline torque relaxation or where front driveline torque relaxation would be desired. In the illustrated example, controller 72 receives a signal from drive mode sensor 84 to determine if vehicle 16 is operating in an "on road" drive mode. If no, control returns to start 202. If yes, control proceeds to step 206 and controller 72 determines if the vehicle speed and/or accelerator pedal are below a predetermined threshold. For example, controller 72 receives a signal from (i) vehicle speed sensor 80 to determine if the speed of vehicle 16 is below a predetermined threshold (e.g., 0-5 mph) and/or (ii) an accelerator pedal sensor (not shown) to determine if a pressure, angle, position etc. of the accelerator pedal is below a predetermined threshold. If above the predetermined threshold, control returns to start 202. If below the predetermined threshold, control proceeds to step 208.

In the example embodiment, at step 208, controller 72 determines if a brake torque driver request and/or actual brake torque are greater than a predetermined threshold. For example, controller 72 receives a signal from a vehicle brake system (e.g., brake pressure sensor 76) indicating brake torque driver request and/or actual brake torque. If below the predetermined threshold, control returns to start 202. If above the predetermined threshold, control proceeds to step 210 where controller 72 determines if transmission 20 is in Drive or other desired gear. For example, controller 72 receives a signal from gear selection sensor 82 indicating which gear (PRNDL) the transmission 20 is in. If not in Drive, control returns to start 202. If transmission 20 is in Drive, control proceeds to step 212.

In the example embodiment, at step 212, controller 72 determines if the slope or grade of the surface the vehicle 16 is on is less than a predetermined threshold (e.g., 7-10%). For example, controller 72 receives a signal from incline sensor 86 indicating the slope of the surface on which the vehicle 16 is resting/traveling. If above the predetermined threshold, control returns to start 202. If below the predetermined threshold, control proceeds to step 214 and controller 72 opens the transfer case clutch assembly 38 to relieve any front driveline torque buildup. At step 216, controller 72 starts a timer when the clutch assembly 38 is opened. At step 218, controller 72 determines if an elapsed time time exceeds a predetermined threshold (e.g., 0.5 to 3.0 seconds). If no, control returns to step 218. If yes, control proceeds to step 220 and controller 72 returns the clutch to normal clutch control (e.g., closes clutch assembly 38). Control then returns to start 202 to operate the control method 200 in a continuous loop.

Described herein are systems and methods for reducing or eliminating drive-idle vibration in four/all wheel drive vehicles. The systems include a control to momentarily open the transfer case clutch when the vehicle is stopped or coming to a stop to thereby break the torque path and relax the front driveline torque to soften the front axle shaft joints. As such, momentary relaxation of front driveline torque is configured to improve isolation of vibration transmitted into the vehicle body through the front axle shafts without adding expensive or heavy enabling features such as custom joints or ball-splines. Further, this front driveline residual torque management and relief strategy can potentially reduce or eliminate the need for Neutral Idle Control (NIC) or Neutral Idle in Drive (NID), and also allow a reduced amount of net torque reduction.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A vehicle having a selective four wheel drive mode of operation, the vehicle comprising:
   an engine;
   a pair of front axle shafts;
   a transfer case having a clutch assembly configured to selectively move between a closed position to enable the engine to drive the front axle shafts, and an open position to disable the engine from driving the front axle shafts; and
   a control system configured to momentarily open the clutch assembly when the vehicle is coming to a stop or is stopped in order to relieve residual torque build-up in the front axle shafts to thereby reduce idle vibration transmission between the engine and a body of the vehicle.

2. The vehicle of claim 1, wherein the control system momentarily opens the clutch assembly to relieve residual torque build-up only when the vehicle is operating in a four-wheel drive mode or an all-wheel drive mode where the clutch assembly is in the closed position such that the engine drives the front axle shafts.

3. The vehicle of claim 1, wherein the momentary opening of the clutch assembly comprises opening the clutch assembly for less than or equal to 5.0 seconds.

4. The vehicle of claim 3, wherein the momentary opening of the clutch assembly comprises opening the clutch assembly for less than or equal to 1.0 second.

5. The vehicle of claim 1, wherein control system momentarily opens the clutch assembly only when the vehicle is stopped.

6. The vehicle of claim 1, wherein control system momentarily opens the clutch assembly only when the vehicle is coming to a stop.

7. The vehicle of claim 1, wherein the control system includes a controller in signal communication with a drive mode sensor, and the control system momentarily opens the clutch assembly only if the controller receives a signal from the drive mode sensor indicating the vehicle is in an on-road drive mode.

8. The vehicle of claim 1, wherein the control system includes a controller in signal communication with a vehicle speed sensor, and the control system momentarily opens the clutch assembly only if the controller receives a signal from the vehicle speed sensor indicating a speed of the vehicle is below a first predetermined threshold and/or the accelerator pedal position is below a second predetermined threshold position.

9. The vehicle of claim 1, wherein the control system includes a controller in signal communication with a brake pressure sensor, and the control system momentarily opens the clutch assembly only if the controller receives a signal from the brake pressure sensor indicating a brake torque driver request is above a first predetermined threshold and/or an actual brake torque is above a second predetermined threshold.

10. The vehicle of claim 1, wherein the control system includes a controller in signal communication with a gear selection sensor, and the control system momentarily opens the clutch assembly only if the controller receives a signal from the gear selection sensor indicating a vehicle transmission is in Drive.

11. The vehicle of claim 1, wherein the control system includes a controller in signal communication with an incline sensor, and the control system momentarily opens the clutch assembly only if the controller receives a signal from the incline sensor indicating a slope of a surface the vehicle is on is less than a predetermined threshold.

12. The vehicle of claim 1, wherein the control system starts a timer when the clutch assembly is momentarily opened and only closes the clutch assembly when the time since the momentary opening is greater than a predetermined threshold.

13. A method of controlling a vehicle having an engine, a pair of front axle shafts, and a transfer case having a clutch assembly selectively movable between a closed position where the engine is enabled to drive the front axle shafts, and an open position where the engine is disabled from driving the front axle shafts, the method comprising:
   operating the transfer case in a four-wheel drive mode or an all-wheel drive mode where the clutch assembly is in the closed position and the engine drives the front axle shafts; and
   upon the clutch assembly being in the closed position and the vehicle is coming to a stop or is stopped, momentarily opening the clutch assembly in order to relieve residual torque build-up in the front axle shafts to thereby reduce idle vibration transmission between the engine and a body of the vehicle.

14. The method of claim 13, further comprising determining the vehicle is in an on-road drive mode, wherein said momentary opening of the clutch assembly is not performed if the vehicle is not in the on-road drive mode.

15. The method of claim 13, further comprising determining if a vehicle speed is less than a first predetermined threshold and/or if an accelerator pedal position is less than a second predetermined threshold,
wherein said momentary opening of the clutch assembly is not performed if the vehicle speed is greater than the first predetermined threshold and/or if the accelerator pedal position is greater than the second predetermined threshold.

16. The method of claim 13, further comprising determining if a brake torque driver request is greater than a first predetermined threshold and/or if an actual brake torque is greater than a second predetermined threshold,
wherein said momentary opening of the clutch assembly is not performed if the brake torque driver request is less than the first predetermined threshold and/or if the actual brake torque is less than the second predetermined threshold.

17. The method of claim 13, further comprising determining if a transmission of the vehicle is in Drive, wherein said momentary opening of the clutch assembly is not performed if the vehicle transmission is not in Drive.

18. The method of claim 13, further comprising determining if a slope of a surface the vehicle is on is less than a predetermined threshold, wherein said momentary opening of the clutch assembly is not performed if the slope is greater than the predetermined threshold.

19. The method of claim 13, further comprising:
determining if the vehicle is in an on-road drive mode;
determining if a vehicle speed is less than a first predetermined threshold and if an accelerator pedal position is less than a second predetermined threshold;
determining if a brake torque driver request is greater than a third predetermined threshold and if an actual brake torque is greater than a fourth predetermined threshold;
determining if a transmission of the vehicle is in Drive; and
determining if a slope of a surface the vehicle is on is less than a fifth predetermined threshold,
wherein said momentary opening of the clutch assembly is performed if the vehicle is in the on-road drive mode, the vehicle speed is less than the first predetermined threshold, the accelerator pedal position is less than the second predetermined threshold, the brake torque driver request is greater than the third predetermined threshold, the actual brake torque is greater than the fourth predetermined threshold, the vehicle transmission is in Drive, and the slope is less than the fifth predetermined threshold.

\* \* \* \* \*